United States Patent
Granström et al.

(10) Patent No.: US 7,469,017 B2
(45) Date of Patent: Dec. 23, 2008

(54) MULTIMODULATION TRANSMITTER

(75) Inventors: Anders Granström, Järfälla (SE);
Gunnar Johansson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 550 days.

(21) Appl. No.: 10/510,338

(22) PCT Filed: Mar. 19, 2003

(86) PCT No.: PCT/SE03/00459

§ 371 (c)(1),
(2), (4) Date: Apr. 5, 2005

(87) PCT Pub. No.: WO03/088511

PCT Pub. Date: Oct. 23, 2003

(65) Prior Publication Data

US 2005/0215206 A1    Sep. 29, 2005

(30) Foreign Application Priority Data

Apr. 5, 2002    (SE) .................................... 0201070

(51) Int. Cl.
*H04L 27/00* (2006.01)
(52) U.S. Cl. .................. 375/295; 370/319; 370/320; 370/330; 370/342; 370/345; 370/347; 333/150; 333/151; 333/152; 333/153; 333/154; 333/155
(58) Field of Classification Search ................ 455/102, 455/127.4; 375/146
See application file for complete search history.

(56) References Cited

U.S. PATENT DOCUMENTS 5,990,734 A    11/1999    Wright et al.

(Continued)

FOREIGN PATENT DOCUMENTS

EP    1102392 A2    5/2001

OTHER PUBLICATIONS

Electronics & Communication Engineering Journal vol. 4/2001 Mann et al "Increasing the talk-time of mobile radios with efficient linear transmitter architectures", pp. 70-71.

(Continued)

*Primary Examiner*—Shuwang Liu
*Assistant Examiner*—Dhaval Patel
(74) *Attorney, Agent, or Firm*—Nixon & Vanderhye P.C.

(57) ABSTRACT

The present invention discloses a double TRU (Transceiver Unit) (45). The output signals from the power amplifiers (64, 84) are combined to one common output signal provided to an antenna arrangement (91). A DSP (Digital Signal Processor) (52, 72) of each TRU (50, 70) comprises means for a constant-envelope modulation scheme (54, 74) and a non-constant envelope scheme (53, 73). The DSP:s (52, 72) select the modulation scheme according to modulation information (49, 69). In such a way, a switching between different modulation schemes can be performed even on a time-slot basis. For non-constant-envelope modulation, the modulated signal is separated into two component signals. Each TRU (50, 70) takes care of the amplification of one component. A phase compensation of at least one of the TRU:s (50, 70) is performed in order to correct for different paths of phases of the power amplifiers (64, 84). The non-constant envelope modulated signal can also be a multi-carrier signal, e.g. of two or more constant-envelope signals. Also a TCC (Transmitter Coherent Combining) operation is achievable.

34 Claims, 12 Drawing Sheets

U.S. PATENT DOCUMENTS

| | | | | |
|---|---|---|---|---|
| 6,748,021 B1 * | 6/2004 | Daly | .......................... | 375/261 |
| 6,799,020 B1 * | 9/2004 | Heidmann et al. | .......... | 455/103 |
| 7,020,215 B2 * | 3/2006 | Porco et al. | ................. | 375/297 |
| 7,184,448 B2 * | 2/2007 | Moon et al. | ................. | 370/442 |

OTHER PUBLICATIONS

International Preliminary Examination Report mailed Feb. 24, 2004 in corresponding PCT Application No. PCT/SE03/000459.

International Search Report mailed Jun. 17, 2003 in corresponding PCT Application No. PCT/SE03/000459.

* cited by examiner

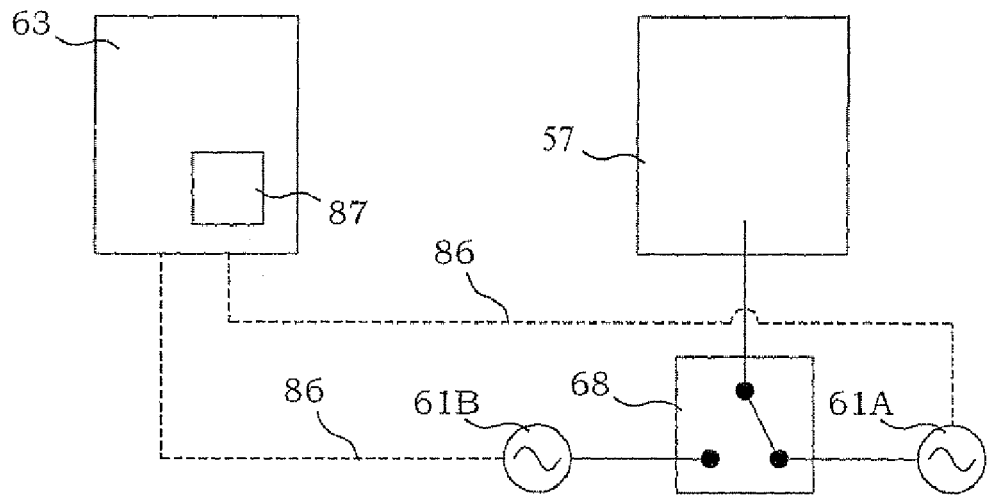
Fig. 18
Fig. 19
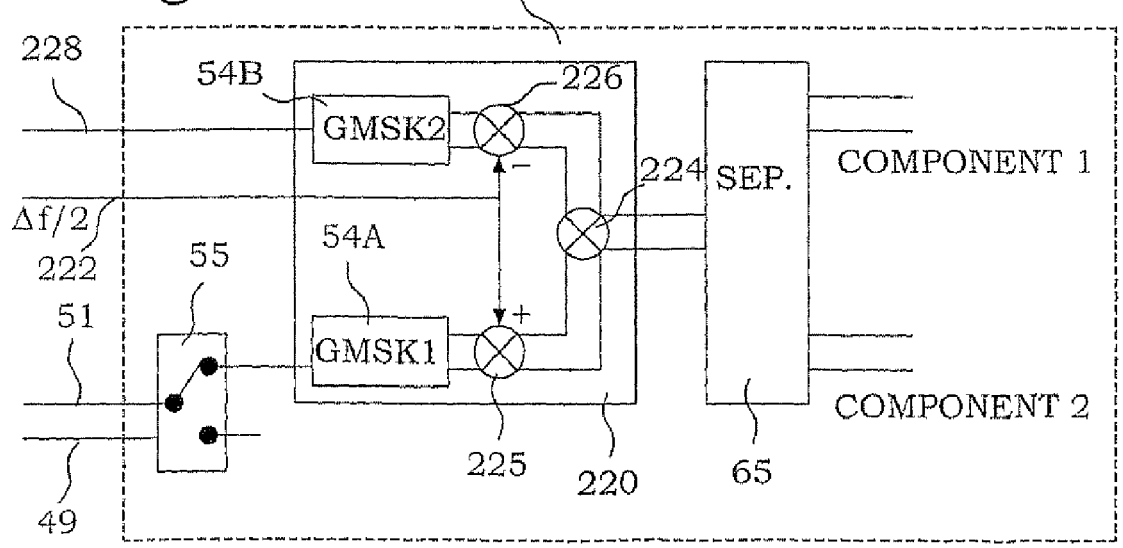
Fig. 20

MULTIMODULATION TRANSMITTER

This application is the US national phase of international application PCT/SE03/00459 filed in English 19 Mar. 2003, which designated the US. PCT/SE02/00459 claims priority of SE Application No. 0201070-0, filed 2 Apr. 2002. The entire contents of these applications are incorporated herein by reference.

TECHNICAL FIELD

The technology of this disclosure relates in general to wireless communication and in particular to wireless communication transmitter systems.

BACKGROUND

In conventional GSM (Global System for Mobile Communication), a modulation scheme according to GMSK (Gaussian Minimum-Shift Keying) is implemented. GMSK is a constant envelope modulation scheme, where a phase shift is differentially dependent on the bit sequence. The GMSK modulation has been chosen as a compromise between fairly high spectrum efficiency and reasonable demodulation complexity.

EDGE (Enhanced Data for Global Evolution) is a high-speed mobile data standard, intended to enable second-generation GSM and TDMA (Time Division Multiple Access) networks to transmit data up to 384 kbps. EDGE provides the speed enhancement by changing the type of modulation used and making better use of the carrier currently used. It enables a greater data transmission speed to be achieved in good conditions, in particular near the base stations by implementing 8PSK (Eight-Phase-Shift Keying) modulation. The 8PSK modulation scheme is a high transmission modulation based on phase shift coding. The modulation is of a non-constant envelope type. EDGE can co-exist with the existing GSM traffic, switching to EDGE mode when appropriate.

When upgrading a base station to handle EDGE, the transmitter system has to be modified. A transmitter used for standard GSM purposes is designed for supporting GMSK, which means that the power amplifier that are used typically are more or less non-linear. When implementing 8PSK, the envelope may vary in a pre-defined way over time, and non-linear amplification can not be accepted. Thus, in a general case, a new parallel transmitter arrangement has to be provided. Since the transmitter devices are costly, parallel transmitter arrangements, which are only used one at a time, means a poor utilization of installed equipment. Furthermore, highly linear power amplifier elements or arrangements are very expensive and there is a request to avoid solutions using such elements.

In "Increasing the talk-time of mobile radios with efficient linear transmitter architectures" by S. Mann, M. Beach, P. Warr and J. McGeehan, Electronics & Communication Engineering Journal, April 2001, Vol. 13, No. 2, pp. 65-76, the relationship between linearizing methods for power amplification in radio transmitters and efficiency is discussed. LINC (LInear Nonlinear Component), known in prior art e.g. by U.S. Pat. No. 5,990,734, is one of the investigated schemes, where one non-constant envelope signal is divided into two constant envelope signals, which subsequently can be amplified by non-linear amplifiers. However, since such a method requires two non-linear amplifiers, this is not a particularly efficient approach for systems also handling constant envelope signals.

SUMMARY

An object of one or more non-limiting embodiments is to provide for using one and the same transmitter system for constant-envelope as well as non-constant envelope modulation schemes. Another object is to provide a transmitter system for non-constant envelope modulation schemes based on non-linear power amplifier elements. A further object is to provide the possibility for fast switching between different modulation schemes.

The above objects are achieved by one or more non-limiting example embodiments. In general, a double TRU (Transceiver Unit) is used. The output signals from the power amplifiers are combined to one common output signal provided to an antenna arrangement. A DSP (Digital Signal Processor) of each TRU comprises means for a constant-envelope modulation scheme and a non-constant envelope scheme. The DSP:s select the modulation scheme according to modulation information provided together with the input digital signal. In such a way, a switching between different modulation schemes can be performed even on a time-slot basis.

In case of a non-constant-envelope modulation, the DSP divides the modulated signal into two component signals. Each TRU takes care of the amplification of one component, and the components are eventually combined before being provided to the antenna arrangement. A phase LO compensation of at least one of the TRU:s is performed in order to correct for different paths or phase positions of the power amplifiers. The non-constant envelope modulated signal can also be a multi-carrier signal, e.g. of two or more constant-envelope signals.

For normal constant-envelope modulation, the two TRU:s are operating independently of each other, and the two output signals are combined to a double-carrier signal.

The arrangement can also be operated according to TCC (Transmitter Coherent Combining) of constant-envelope modulated signals, where both TRU:s are provided with the same digital signal. The two amplified output signals are combined to create an output signal of double the amplitude. Also here, phase compensation is desirable.

The phase compensation is preferably determined by monitoring the output power or monitoring the power in the load of the hybrid and comparing with expected output power. In one non-limiting example embodiment, a calibration of the phase compensation is performed during TCC bursts, and utilized during non-constant envelope modulation. Other non-limiting examples embodiments utilize constant amplitude portions of non-constant envelope time slots for performing phase compensation calibration. One may then make use also of power measurements of the output signals from each power amplifier. The phase compensation calibration can also be performed during well-characterized training sequences within the time slots.

BRIEF DESCRIPTION OF THE DRAWINGS

The invention, together with further objects and advantages thereof, may best be understood by making reference to the following description taken together with the accompanying drawings, in which:

FIG. 18 is a block diagram illustrating a part supporting frequency hopping of a non-limiting example embodiment of the present invention;

FIG. 19 is an illustration of a storage of phase shifts usable together with one or more non-limiting examples the present invention; and FIG. 20 is a block diagram of one transmitter unit supporting double carrier signals of a non-limiting example embodiment of a double transmitter unit according to the present invention.

DETAILED DESCRIPTION

Figure 1:
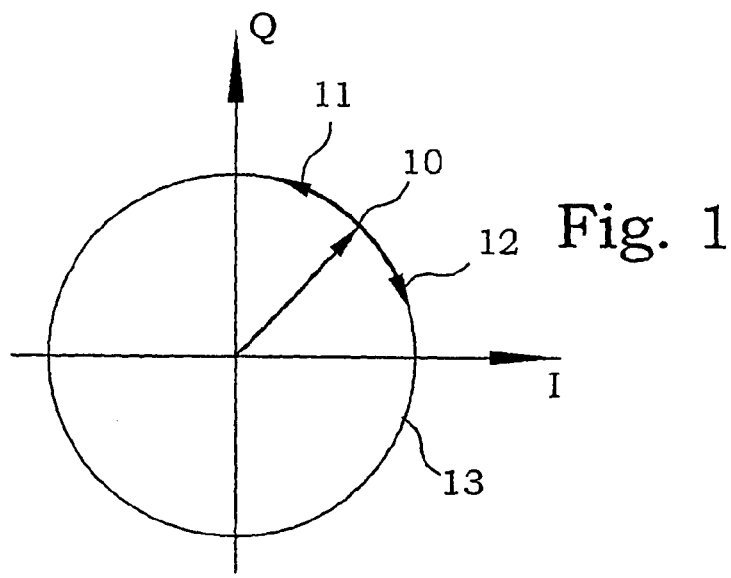
FIG. 1 is a vector diagram illustrating a constant envelope signal.

A signal modulated according to the GMSK modulation scheme can be visualized in the complex signal plane as illustrated in FIG. 1. The coordinate system is here supposed to rotate synchronously with the base frequency of the carrier, and only the phase differences will therefore appear in the diagram. A modulated signal is thereby represented by a vector 10. In GMSK, the phase shift is adjusted according to three successive bits in the digital input signal. Generally speaking, the phase is smoothly shifted $\pi/2$ if the three successive digits are the same. This means that the vector 10 shifts counterclockwise according to arrow 11 if the successive digits are the same and clockwise according to arrow 12 if they are different. All the time, the so vector 10 maintain its magnitude, i.e. the end of the vector 10 always travels on a circle 13 in the I-Q-space. The modulation scheme is therefore said to be a constant-envelope scheme. It is relatively easy to amplify a constant-envelope signal, since also non-linear power amplifiers may be used. Since the signal always has one and the same envelope, the gain is always the same, regardless of the linearity of the amplifier. Simpler power amplifier solutions can thereby be used.

Figure 2:
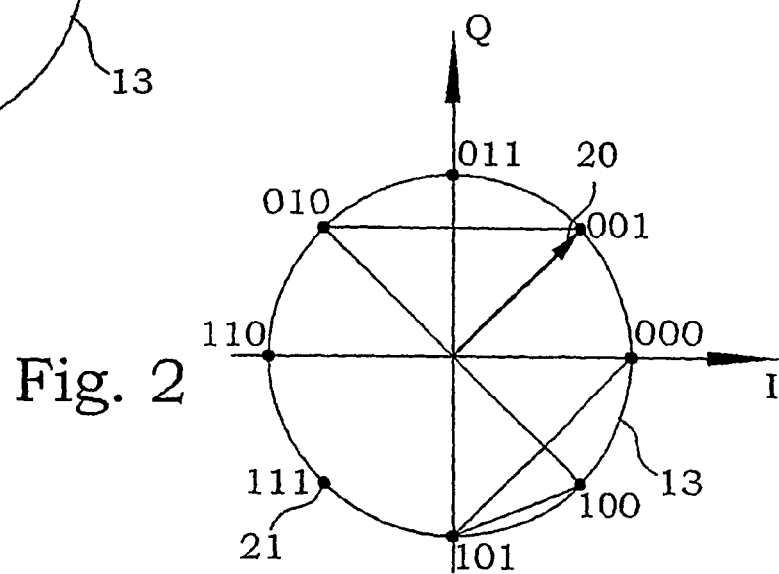
FIG. 2 is a vector diagram illustrating a non-constant envelope signal.

A signal modulated according to the 8PSK modulation scheme can be also be visualized in the complex signal plane as illustrated in FIG. 2. The coordinate system is also here supposed to rotate synchronously with the base frequency of the carrier, and only the phase differences will therefore appear in the diagram. A modulated signal is thereby represented by a vector 20. In 8PSK, the phase shift is a coding of a triplet of binary digits. A certain phase shift corresponding to a specific set of digits, as indicated by points 21 in the figure. Depending on the scheme, the assignment may vary, and there might also be an offset phase shift present, which removes the points from the axes. However, the example in FIG. 2 illustrates well the principle. When changing from one triplet to the next, the vector moves from one point 21 to another and passes thereby through the interior of the circle 13. The modulation scheme is therefore said to be a non-constant-envelope scheme. When amplifying an 8PSK signal, the amplifier arrangement has to have relatively linear characteristics, since the signal will change its magnitude. Highly linear amplifiers are expensive and simpler solutions are desired.

Figure 3:
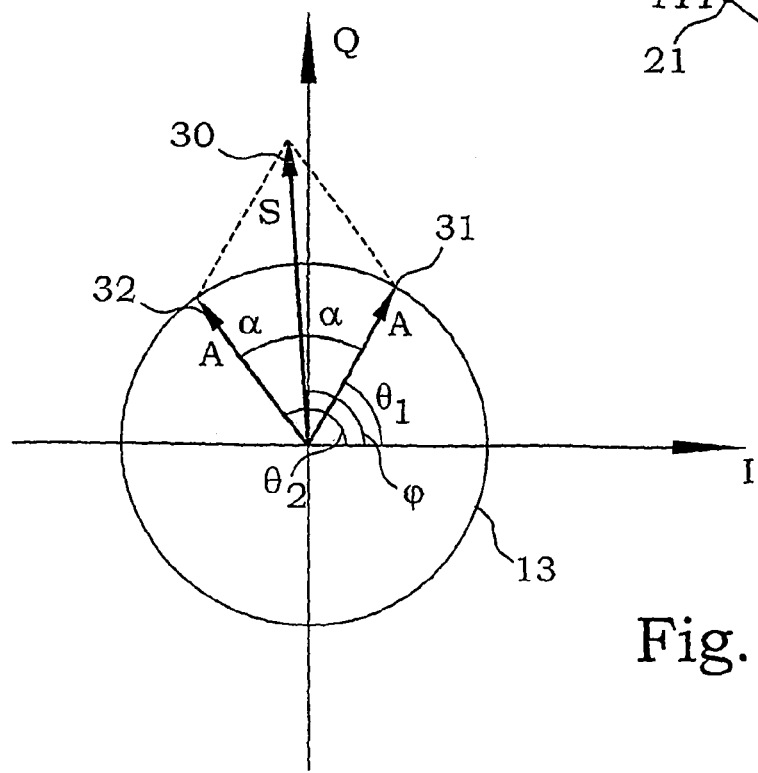
FIG. 3 is a vector diagram illustrating principles of separating an arbitrary signal into two constant envelope signals.

One possible approach to provide a linear amplification is to decompose or separate the signal into two component signals, amplify these component signals and combine the amplified component signals again. If one keeps the component magnitudes constant, even non-linear amplifiers can be used. This principle, LINC (LInear Nonlinear Component) amplifier, is known in prior art, e.g. by U.S. Pat. No. 5,990,734. One thereby trades one linear amplifier for two non-linear ones, plus a separator and combiner. FIG. 3 illustrates the principles. A signal to be amplified is represented by a vector 30. The vector 30 has a varying size S and phase shift $\phi$. The vector 30 is separated into two component vectors 31, 32. In a first embodiment, the amplitude A of the components is the same and follows the circle 13. This amplitude has to be at least half of the maximum amplitude of the vector 30. Also the phase difference a to the vector 30 is the same, however, directed in opposite directions. According to basic geometrical considerations, the component phase shifts $\theta_1$ and $\theta_2$ are specified by:

$$\theta_1 = \phi - \arccos(S/2A)$$

$$\theta_2 = \phi + \arccos(S/2A).$$

As anyone skilled in the art understand, it is by this possible to express any arbitrary vector of length $\leq 2A$ by two component vectors of length A. The component signals can then be amplified according to principles of amplifying constant-envelope signals.

In a more general case, the amplitudes of the components may be different and may also vary depending on the size and phase of the vector 30. Such applications will be discussed more in detail below.

Figure 4:
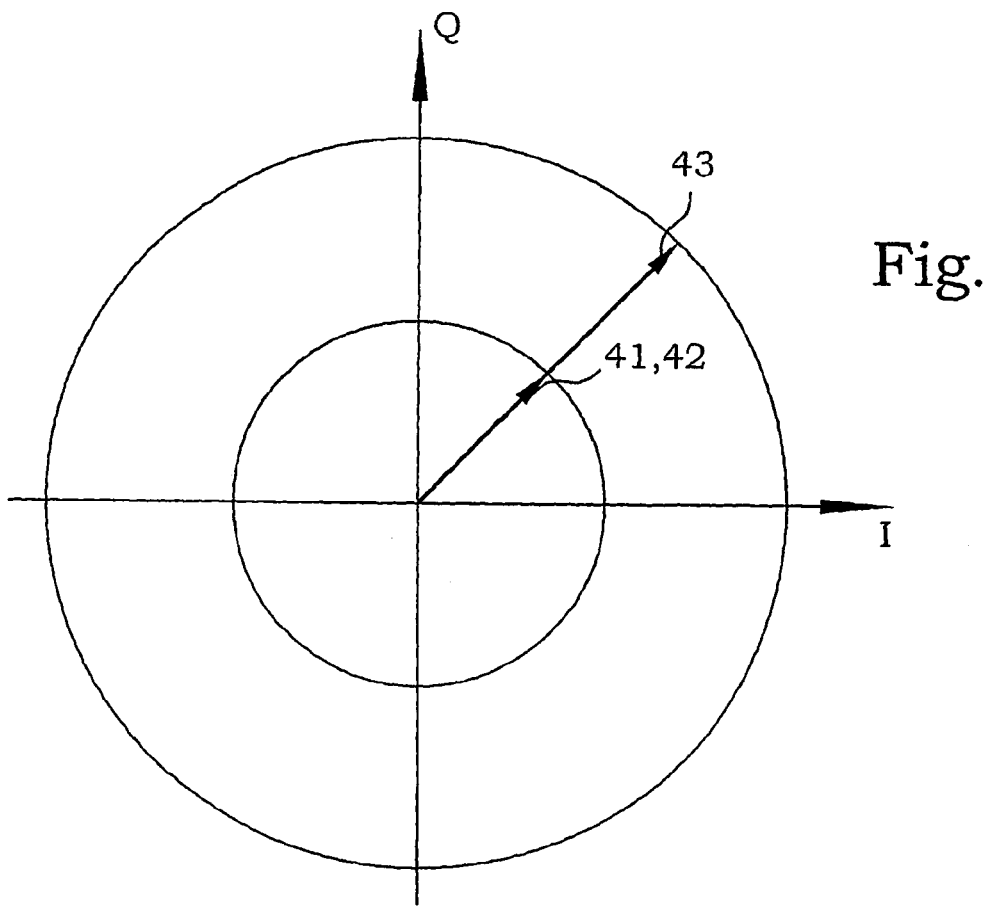
FIG. 4 is a vector diagram illustrating the principles of transmitter coherent combining.

A special case of combining two component signals into one final output signal is in case two component signals always with the same phase are combined. This can be used in cases where a high amplification is desired, and where it is difficult to achieve by only one amplifier. As shown in FIG. 4, two components 41, 42 (seen as one vector in the figure) of the same phase can then be amplified separately and combined into an output signal 43. This is the basic idea of TCC (Transmitter Coherent Combining).

Figure 5:
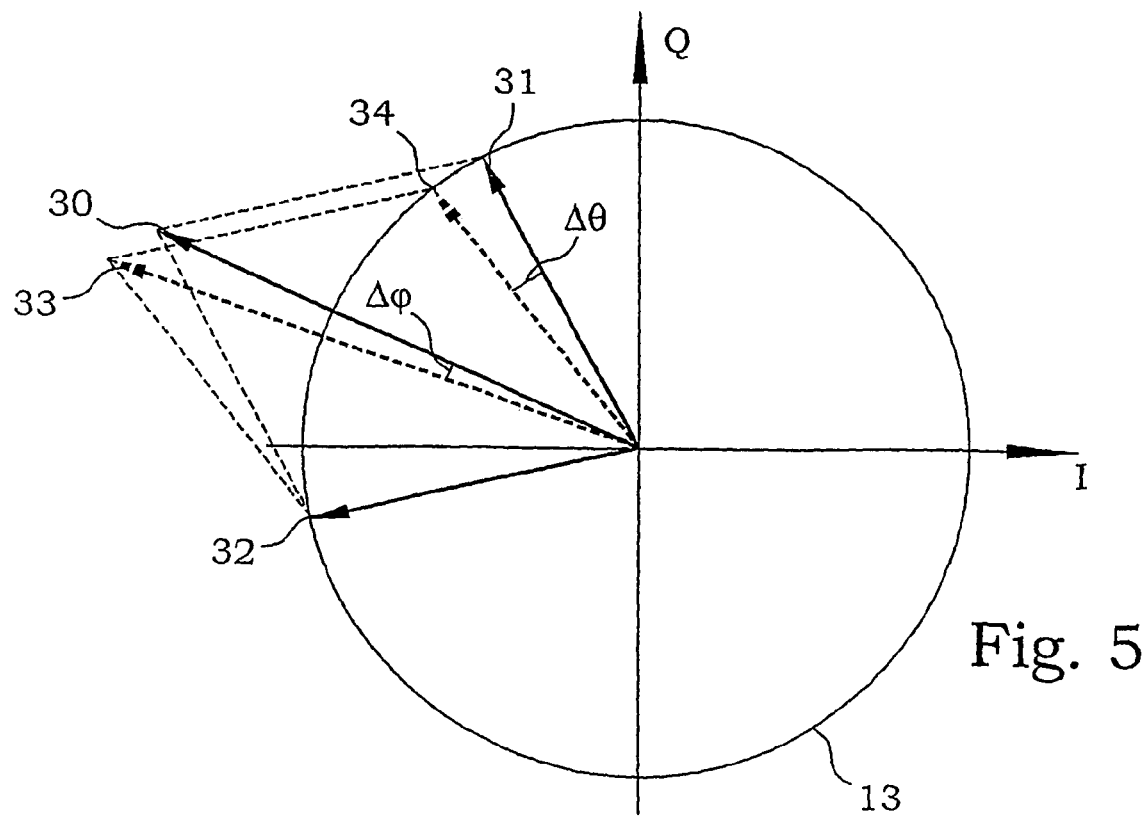
FIG. 5 is a vector diagram illustrating the effect of phase errors in transmitter coherent combining.

A practical problem in combining two separate signals into one output signal is that the paths through the amplifiers typically involves some path difference or that the devices are locked in different phase positions, which will be noticed as a small phase shift between the two component signals. Such a situation is illustrated in FIG. 5. A signal 30 is separated into two components 31, 32. During amplification, the first one of the components is shifted $\Delta\theta$ compared to the second one. This phase shifted components is illustrated by a broken arrow 34. The actual composed output signal 33 will then be changed both in phase and amplitude. One solution is to measure the phase shift difference carefully and compensate for it by introducing phase altering means in one of the paths. However, such a phase shift may also be slowly varying with time, and in such cases, an adaptive phase compensating arrangement has to be introduced. A preferred embodiment of such an arrangement will be described farther below.

Figure 6:
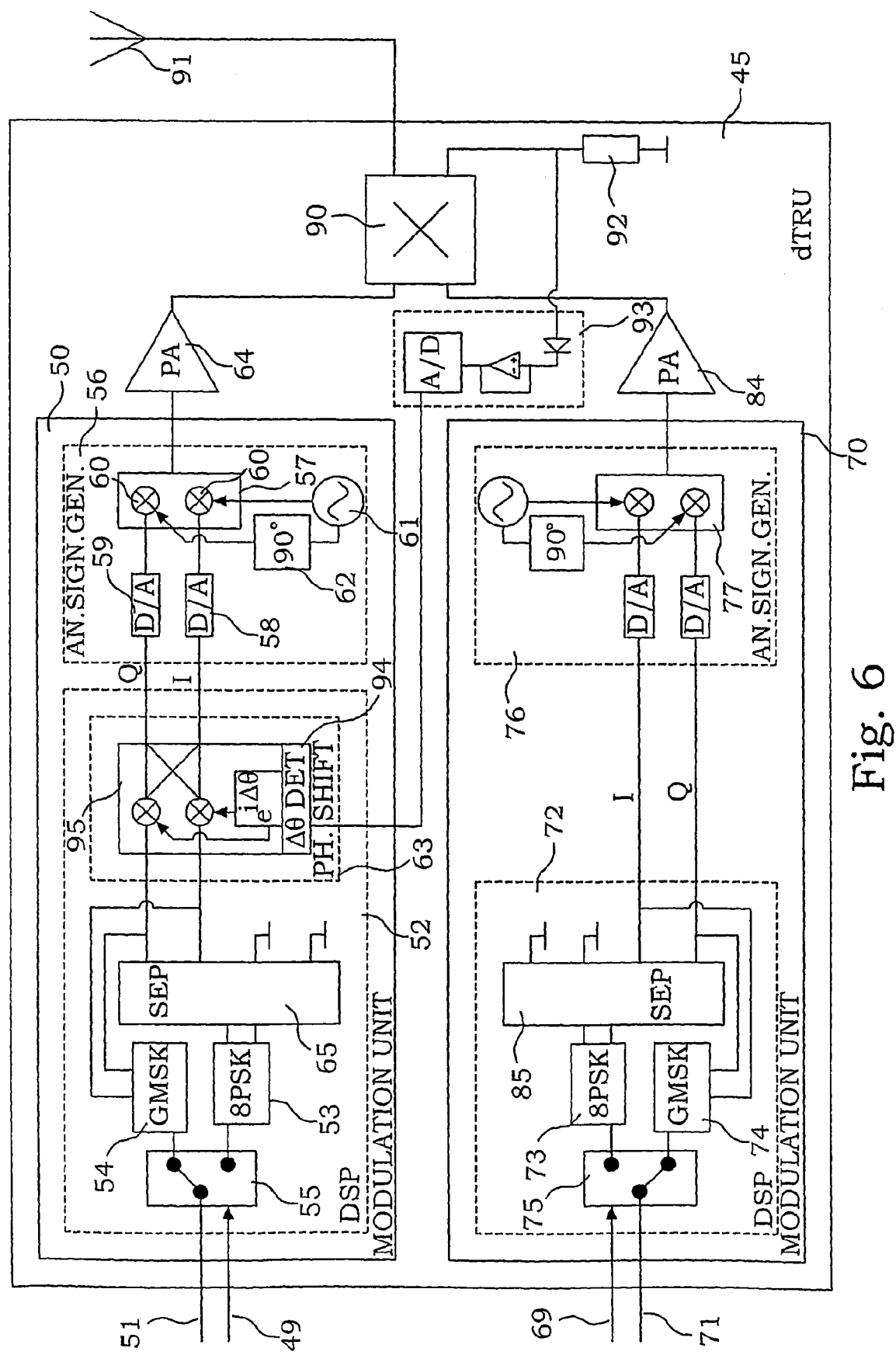
FIG. 6 is a block diagram illustrating a non-limiting example embodiment of a double transmitter unit according to the present invention.

A non-limiting example embodiment of a double transmitter unit arrangement 45 is illustrated in FIG. 6. A first modulation unit 50 has an input 51 for receiving a digital signal to be transmitted. The input 51 is connected to a DSP (digital signal processor) 52. The DSP 52 comprises modulation means; a 8PSK modulator 53 and a GMSK modulator 54. The DSP 52 also comprises a control input 49 for receiving modulation information, and a selector 55. The selector 55 selects one of the modulators 53, 54 according to the modulation information received by the control input 49. The digital signal received by the input 51 is thereby provided to one of the modulators 53, 54. The different means in the DSP 52 can be implemented as software.

The GMSK modulator 54 modulates the input digital signal according to the GMSK scheme. The modulated signal is in this embodiment provided in a real I and an imaginary part Q at two outputs, connected to an analogue signal generator 56. In this embodiment, the analogue signal generator 56 comprises a quadrature modulator 57. The analogue signal generator 56 also comprises two DAC's (Digital-to-Analogue Converters) 58, 59 converting the I and Q signals, respectively, into analogue voltages. The analogue voltages are modulated in a mixer 60 with the carrier frequency, provided by a frequency generator 61, and combined. A phase shifter 62 shifts the frequency signal to the Q component by 90 degrees. The output from the analogue signal generator 56 is thus an analogue voltage signal being modulated, in this ease according to the GMSK scheme.

A phase shifter 63 is in this embodiment connected between the modulators 53, 54 and the quadrature modulator 57. The function of this unit will be described more in detail further below. The analogue signal from the analogue signal generator 56 is provided to a power amplifier 64 for amplification. In the present embodiment, the power amplifier 64 is a non-linear amplifier. The amplified signal from the output of the power amplifier 64 is provided to an input of a hybrid combiner device 90.

The output of the 8PSK modulator 53 is provided to a separator 65. The separator separates the signal provided from the 8PSK modulator into two components, whereby the input signal is the vector sum of the two components. A first one of the components is provided to the input of the analogue signal generator 56, in the form of an I and a Q signal. In the present embodiment, the second component is terminated. The first component is processed in the analogue signal generator 56 in the same manner as described above.

A second modulator unit 70 is very similar to the first modulation unit 50. It has an input 71 for a digital signal and a control input 69. A DSP 72 comprises analogously a 8PSK modulator 73 and a GMSK modulator 74, and a selector 75 selecting which of the modulator that is going to be used.

The GMSK modulator 74 is similarly connected to an analogue signal generator 76, having a quadrature modulator 77. However, no phase shifter is present. The quadrature modulator 77 is of the same structure as the one in the first modulation unit 50.

The analogue signal from the analogue signal generator 76 is provided to a power amplifier 84 for amplification. In the present embodiment, the power amplifier 84 is a non-linear amplifier of the same type as the power amplifier 64. The amplified signal from the output of the power amplifier 84 is provided to a second input of the hybrid combiner device 90.

The output of the 8PSK modulator 73 is provided to a separator 85, having the same function as the separator 65. The separator 85 separates the signal provided from the 8PSK modulator into two components, whereby the input signal is the vector sum of the two components. In the present embodiment, the first component is terminated. The second component is instead provided to the input of the analogue signal generator 76, in the form of an I and a Q signal. The second component is processed in the analogue signal generator 76 in the same manner as described above.

The hybrid combiner device 90 combines the two signals provided by the outputs of the two power amplifiers 64, 84 into a transmitter signal, that is provided to a transmitted device 91. The input power supplied by the power amplifiers 64, 84 is at least to a part provided as a transmitter signal power. However, any remaining power will be dissipated by a hybrid load 92.

In the present embodiment, the power dissipated over the hybrid load 92 is measured by a power meter 93. The output of the power meter 93 is connected to the phase shifter 63 via an ADC (Analogue-to-Digital Converter). The value of the hybrid load power is provided to a phase controller 94, which calculates any phase shift between the amplified signals provided to the hybrid. The phase shifter 63 further comprises a complex multiplier 95, providing a digital phase shift angle $e^{j\Delta\theta}$ to the I and Q signals respectively. This phase shift is thus in a complex manner incorporated in the I and Q signals that are entering into the analogue signal generator 56.

By this double transmitter unit arrangement 45, a number of different modulation techniques can be employed. By accompanying the digital signals with associated modulation information, the switching between different modulation schemes can be performed very swiftly, even on a time slot basis. Such an arrangement thus allows the transmitter arrangement 45 to allow for mixing e.g. GMSK bursts with 8PSK traffic on a time slot basis.

Some examples of different operation modes of the double transmitter unit 45 are given here below. Assume normal GMSK traffic. The double transmitter unit 45 then operates as two independent transmitter paths, having one carrier each. A digital signal of a first carrier is provided to the first modulation unit 50, while a digital signal of a second carrier is provided to the second modulation unit 70. The modulation information instructs both DSP's 52, 72 to select a GMSK modulation. The two carrier signals are combined in the hybrid combiner 90 into a common signal, provided to the transmitter. The phase shifter arrangement is in this case not used.

In case a GMSK signal with a high output power is desired, a TCC arrangement can be achieved. In such a case, the same digital signal is provided to both modulation units 50, 70 together with a request for GMSK modulation. Both transmitter units are processing the same signal and the combined signal at the hybrid combiner 90 output is ideally of double the output power. In comparison with combining two different carriers, the TCC carrier is provided with a power four times higher. This is due to the fact that half the power dissipates in the load when combining two different carriers, while coherent combining removes all power from the load. However, as discussed above, any phase shifts caused by path differences in the two branches may deteriorate the total signal. In this TCC arrangement, the phase shifter 63 comes into use. In this embodiment, the power over the hybrid load 92 is measured. If the amplifier branches are perfectly aligned in phase, all power will be distributed to the transmitter device 91, which means that no power will be dissipated through the hybrid load. By adjusting the phase of the signal in one of the paths, the hybrid load power can be minimized, which indicates an alignment in phase of the two components.

A third operational mode is when a 8PSK signal is to be transmitted. Also in this case, both inputs 51, 71 are provided with the same digital signal. This signal will be modulated according to the 8PSK scheme since the selectors 55, 75 selects the 8PSK modulator 53, 73. The separator 65 in the DSP 52 of the first modulation unit 50 provides a first component signal to the analogue signal generator 56. The separator 85 in the DSP 72 of the second modulation unit 70 provides instead a second component signal to the analogue signal generator 76. The vector sum of these two components equals the original 8PSK-modulated signal. Each of the components are amplified in a separate power amplifier 64, 84, and combined in the hybrid combined device 90 to form an amplified version of the original signal. The double transmitter unit arrangement 45 thus here operates at least partly in accordance with the LINC concept, providing one 8PSK carrier signal. Also here, phase shifts between the paths may appear. Different approaches for solving this problems are discussed further below.

Figure 7:
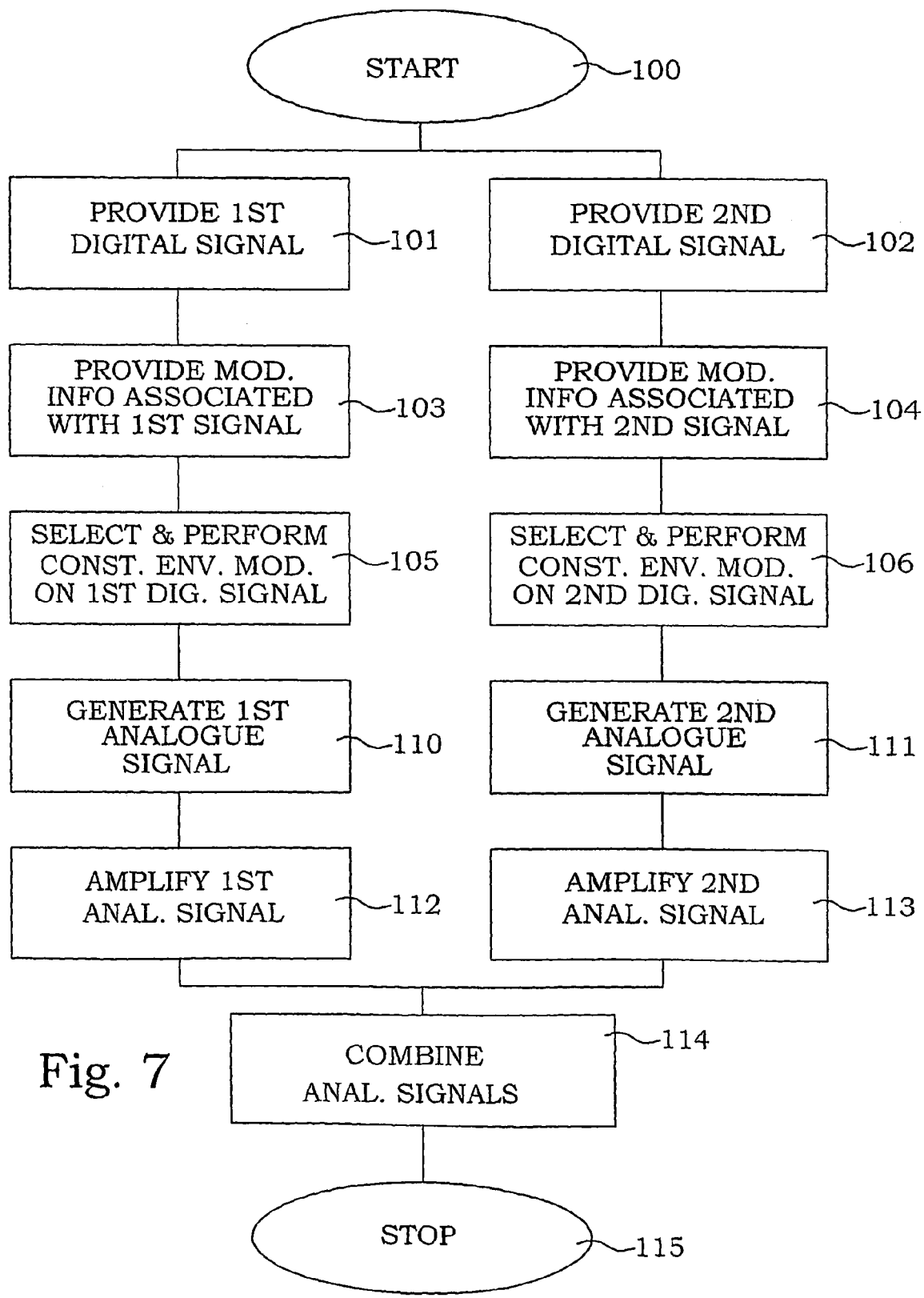
FIG. 7 is a flow diagram illustrating a non-limiting example method for providing two constant envelope modulated signals according to the present invention.
Figure 8:
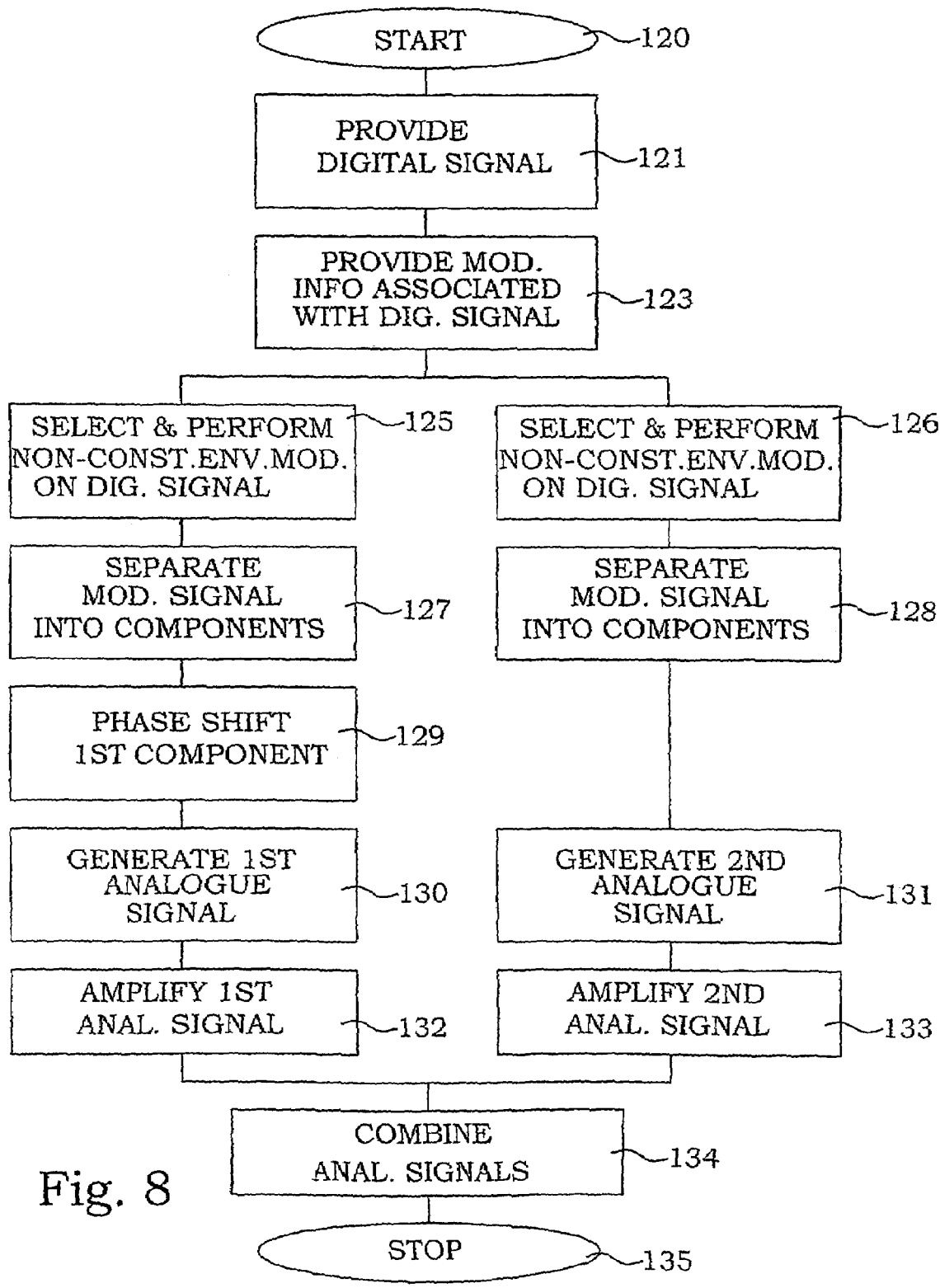
FIG. 8 is a flow diagram illustrating a non-limiting example method for providing a non-constant envelope modulated signal according to the present invention.
Figure 9:
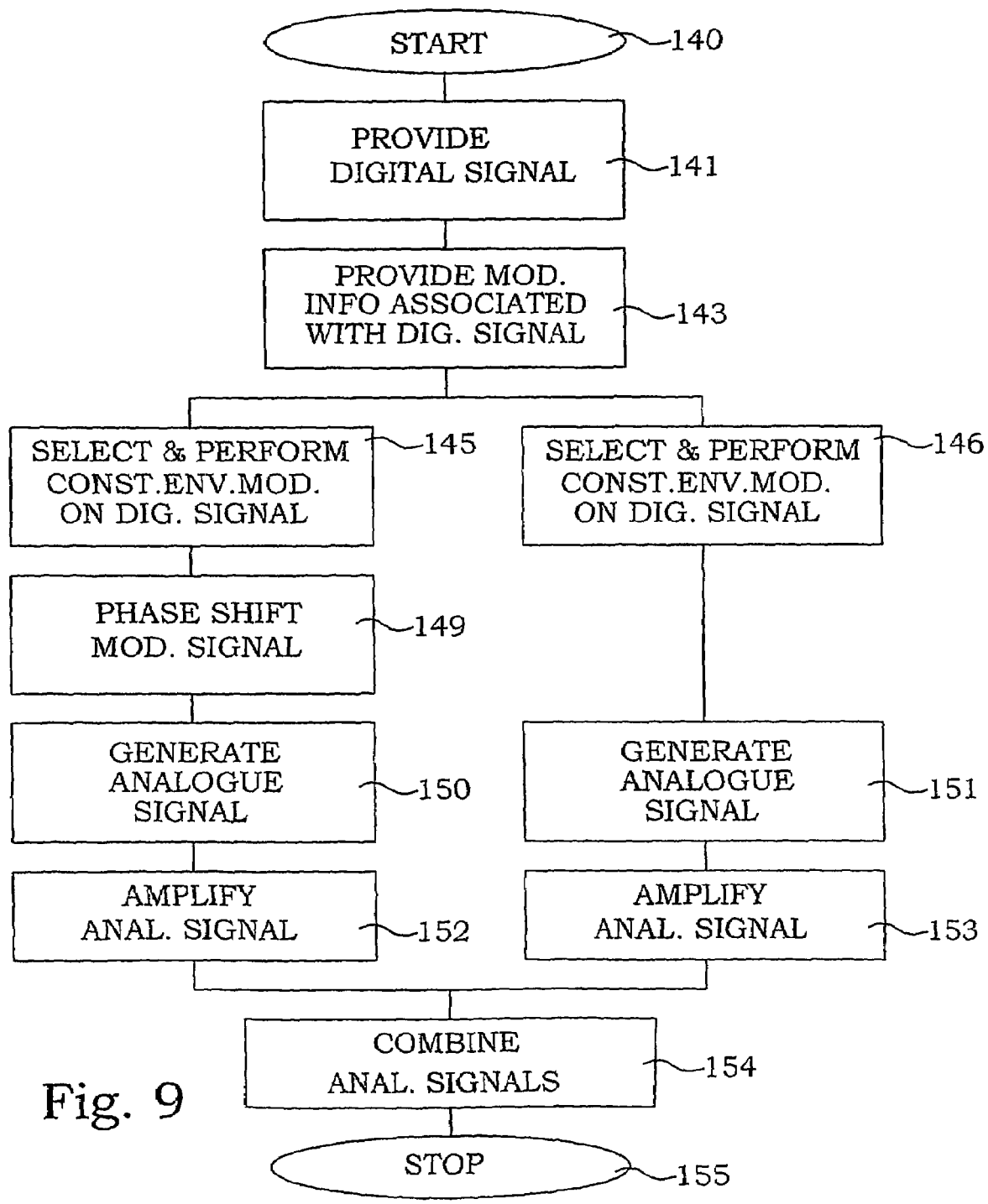
FIG. 9 is a flow diagram illustrating a non-limiting example method providing transmitter coherent combining according to the present invention.

In FIG. 7-9, the above operations are illustrated as flow diagrams. First, in FIG. 7, a non-limiting example method of providing two GMSK signals on one carrier each is illustrated. The procedure starts in act 100. In act 101, a first digital signal is provided to a first transmitter unit. This first digital signal is intended to be transmitted on a first carrier. In act 102, a second digital signal is provided to a second transmitter unit. This second digital signal is intended to be transmitted on a second carrier. In act 103, constant-envelope modulation information is provided to the first transmitter unit. In act 104, constant-envelope modulation information is provided to the second transmitter unit. A. constant-envelope modulation scheme is selected and applied in the first transmitter unit according to the modulation information in act 105, and a constant-envelope modulation scheme is selected and applied in the second transmitter unit according to the modulation information in act 106. A first analogue signal corresponding to the first digital signal modulated according to the information is generated in act 110. A second analogue signal corresponding to the second digital signal modulated according to the information is generated in act 111. In act 112, the first analogue signal is amplified and in act 113, the second analogue signal is amplified. In act 114, the two amplified signals are combined to a two-carrier output signal to be transmitted. The procedure is ended in act 115.

FIG. 8 illustrates an example non-limiting method of providing a signal modulated according to a 8PSK modulation according to the present invention is illustrated. The procedure starts in act 120. In act 121, a digital signal is provided to a first transmitter unit and the same digital signal is also provided to a second transmitter unit. In act 123 non-constant-envelope modulation information is provided to the first transmitter unit and to the second transmitter unit. A non-constant-envelope modulation scheme is selected and applied in the first transmitter unit according to the modulation information in act 125, and a non-constant-envelope modulation scheme is selected and applied in the second transmitter unit according to the modulation information in act 126. In act 127, the modulated signal in the first transmitter is separated into a first and a second component. In act 128 the modulated signal in the second transmitter is separated into the same first and second components. The first component is phase shifted in act 129 to compensate for differences in phase characteristics between the paths through amplifier stages of the first and second transmitter unit, respectively. A first analogue signal corresponding to the first phase-shifted component is generated in act 130. A second analogue signal corresponding to the second component is generated in act 131. In act 132, the first analogue signal is amplified and in act 133, the second analogue signal is amplified. In act 134, the two amplified signals are combined to a single-carrier output signal to be transmitted. The procedure is ended in act 135.

FIG. 9 illustrates the case of a TCC operation. The procedure starts in act 140. In act 141, a digital signal is provided to a first transmitter unit and the same digital signal is provided also to a second transmitter unit. This digital signal is intended to be transmitted with a double intensity. In act 143, constant-envelope modulation information is provided to the first transmitter unit and to the second transmitter unit. A constant-envelope modulation scheme is selected and applied in the first transmitter unit according to the modulation information in act 145, and a constant-envelope modulation scheme is selected and applied in the second transmitter unit according to the modulation information in act 146. The first modulated signal is phase shifted in act 149 to compensate for differences in phase characteristics between the paths through amplifier stages of the first and second transmitter unit, respectively. A first analogue signal corresponding to the first digital signal modulated according to the information and phase-shifted is generated in act 150. A second analogue signal corresponding to the second digital signal modulated according to the information is generated in act 151. In act 152, the first analogue signal is amplified and in act 153, the second analogue signal is amplified. In act 154, the two amplified signals are combined to double the amplitude of a single-carrier output signal to be transmitted. The procedure is ended in act 155.

The three flow diagrams exhibit large resemblances. The changes in the different acts are of such a character, that it can be changed by e.g. software as a response on e.g. the modulation information given. Such information can be provided on a time-slot basis, i.e. the requested modulation can be changed from one time-slot to the next. This implies that also the different operational modes are interchangeable from one time-slot to the next.

Figure 10:
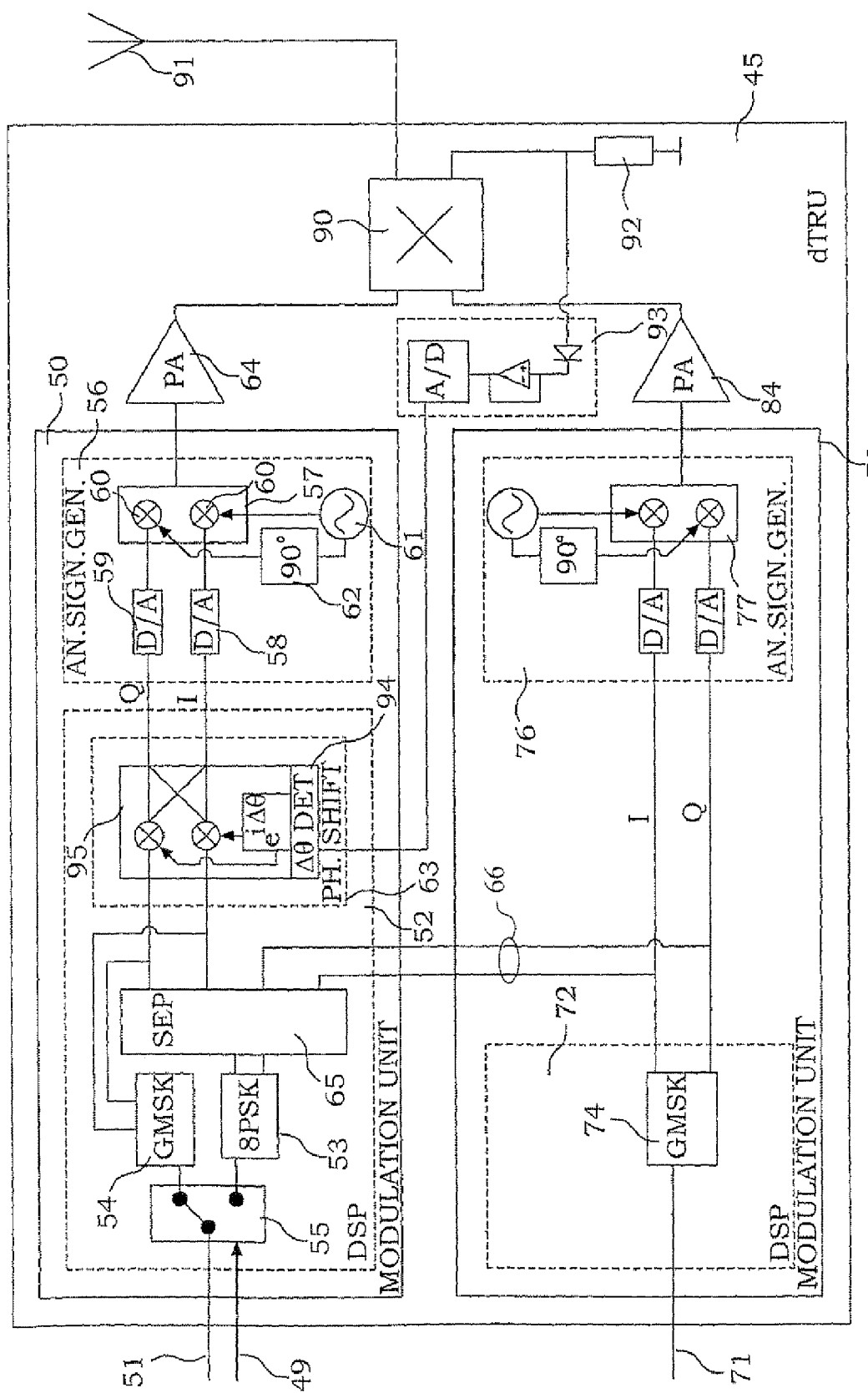
FIG. 10 is block diagram illustrating another non-limiting example embodiment of a double transmitter unit according to the present invention.

Some modifications of the above embodiments are also interesting to be disclosed. In FIG. 10, another embodiment of a double transmitter arrangement according to the present invention is illustrated. Most parts are identical to the ones in the first illustrated embodiment, and will not be discussed again. However, some clear differences are present. First of all, it can be noted that in the previous embodiment, identical modulation and separation operations are performed in parallel in the first and second modulation units 50, 70. This can be avoided by the present design, in which the second modulation unit 70 does not explicitly have any separator. Instead, a connection 66 connects the output for the second component of the separator 65 in the first modulation unit 50 with the input of the analogue signal generator 76 of the second modulation unit 70. In this manner, the second modulation unit 70 can be made somewhat simpler and the computational effort during the operation is concentrated to the first modulation unit 50. A connection 67 also connects the output of the GMSK modulator of the first modulation unit 50 with the input of the analogue signal generator 76 of the second modulation unit 70. This enables the corresponding simplification to be performed for the TCC operation.

Figure 11:
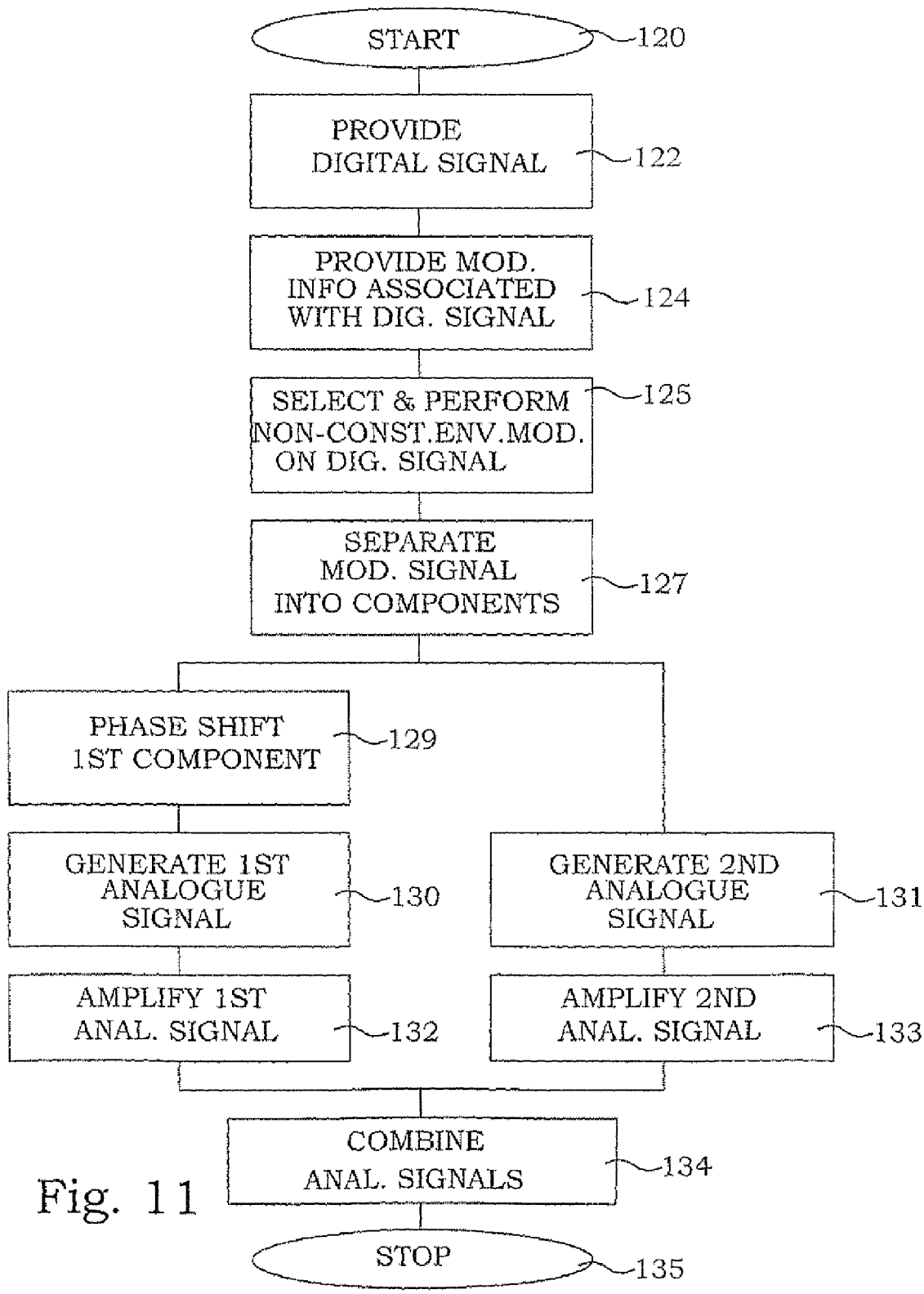
FIG. 11 is a flow diagram illustrating another non-limiting example method for providing a non-constant envelope modulated signal according to the present invention.

FIG. 11 illustrates a flow diagram corresponding to the 8PSK operation with the embodiment of FIG. 10. Since the steps present are identical with some of the steps of the procedure of FIG. 8 they are not discussed again. Basically, the steps 126 and 128 are omitted and the steps 121 and 123 are changed into steps 122 and 124 respectively, in which only the first transmitter unit is involved. The second component used in step 131 is in this embodiment, however, provided from the first modulation unit.

Figure 12:
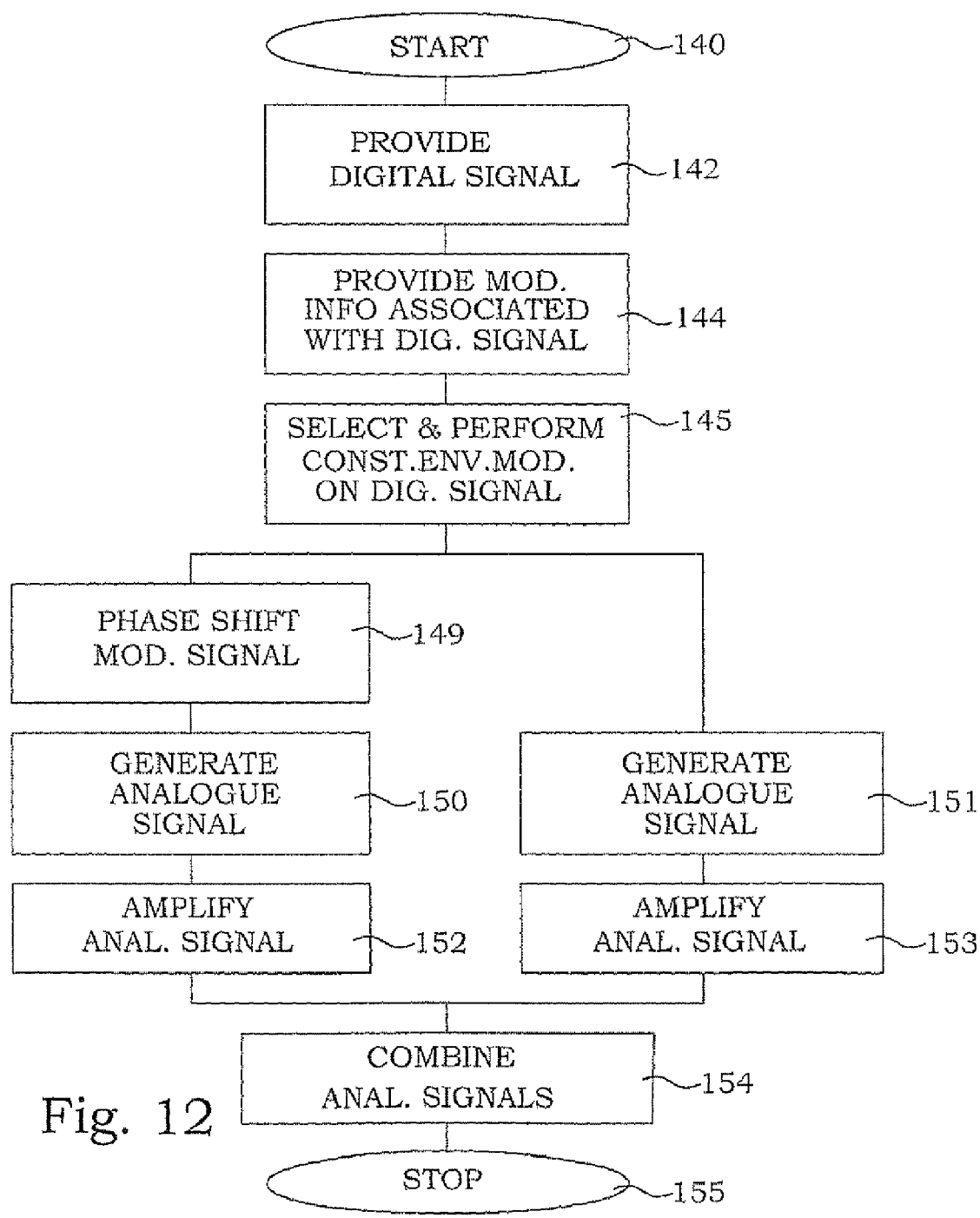
FIG. 12 is a flow diagram illustrating another non-limiting example method providing transmitter coherent combining according to the present invention.

FIG. 12 illustrates a flow diagram corresponding to the TCC operation with the embodiment of FIG. 10. Since the steps present are identical with some of the steps of the procedure of FIG. 9 they are not discussed again. Basically, the step 146 is omitted and the steps 141 and 143 are changed into steps 142 and 144 respectively, in which only the first transmitter unit is involved. The second modulated signal used in step 151 is in this embodiment, however, provided from the first modulation unit.

Now returning to FIG. 6. In this embodiment, the phase shifting of the signal provided to the first power amplifier 64 was based on a measurement of the power of the hybrid combiner load 92. Since there is a complementary relationship between the power to the transmitter device 91 and the load 92, either power can be measured and the other can be calculated. Measuring the load power is a relatively easy task, but of course, a direct measuring of the power supplied to the transmitter device is possible. The evaluation performed in the phase shifter 63 has of course to be changed accordingly.

The phase shifting during TCC operation is relatively straight-forward. The power dissipated in the load 92 is minimised, and the two signals are thereby phase-synchronized. However, in the case of 8PSK operation, the possible manners of performing the phase-shifting are less obvious. In a system, where the flexibility of the present invention is fully used, the character of the transmitted signals varies. If TCC operation appears occasionally, the phase-shifting can be calibrated during such TCC time slots. The values of the optimum phase shift can then be stored, e.g. in the phase shifter 63, to be used e.g. during 8PSK operation.

The situation may, however, be somewhat more complex if the arrangement is designed also for frequency hopping. In FIG. 18, a part of a double transmitter arrangement is illustrated. The analogue signal generator 56 of the first modulation unit 50 is illustrated to have access to two different frequency generators 61A and 61B. A switch 68 connects one frequency generator at a time to the quadrature modulator 57. In the meantime, the other frequency generator is controlled to be tuned to the next frequency to use. When the frequency change is to be carried through, the switch 68 selects the other frequency generator. Each frequency used may influence the amplifier equipment to give different phase shifts. This means that the phase shift applied to the signal to be amplified in e.g. TCC or 8PSK mode has to be calibrated at that particular frequency. If the phase shifts are calibrated during ICC mode and stored to be used in 8PSK mode, there has to be one phase shift value for each frequency used by the arrangement. Also, the two frequency generators 61A and 61B may give rise to different phase shifts, whereby one calibrated phase shift for each combination of frequency generator and frequency is needed. A signal can be sent from the frequency generators 61A, 61B to the phase shifter 63 by a connection 86, for instructing the phase shifter which phase shift to apply.

A storage 87 of phase shifts, e.g. comprised in the phase shifter 63 can be configured as illustrated by FIG. 19. The storage 87 is here designed as a look-up table, with two input variables, identity of frequency generator used and the frequency of that frequency generator.

Figure 13:
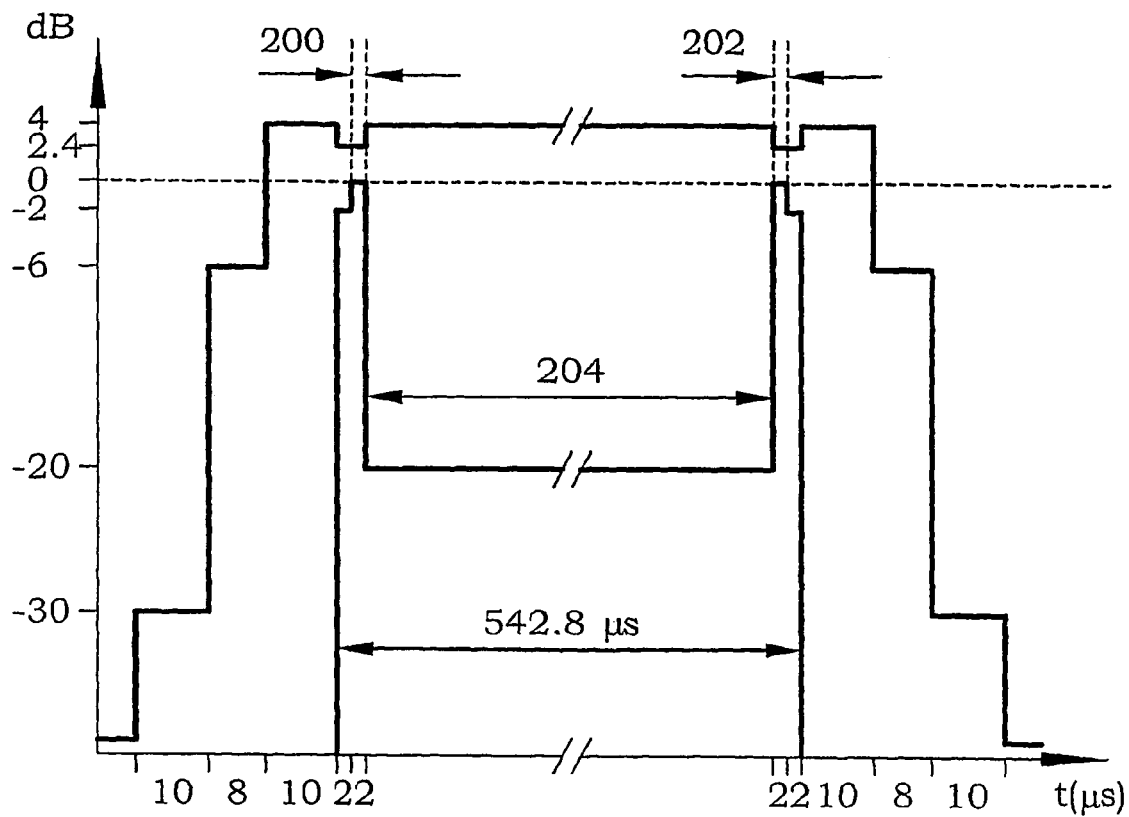
FIG. 13 is a diagram illustrating a power versus time mask for an 8PSK modulated normal burst.

There are also alternative ways of obtaining calibrated phase shifts for the 8PSK operation. These are necessary in cases there are no or very few TCC time slots. If only one power measure is available, e.g. the power dissipated in the load 92 (FIG. 8), there has to be some inherent knowledge of the expected power to the transmitter device. In FIG. 13, a PVT (Power Versus Time) mask for 8PSK modulated normal burst is shown. The PVT mask defines the envelope range in which the 8PSK signal is allowed to vary. At a short time period before 200 and after 202 the main signal period 204, the maximum and minimum power curves are separated by only 2.4 dB. This implies that without any knowledge of the actual system, the actual power of the signal is known with an accuracy of at least 2.4 dB. However, in most cases, design considerations are known and the accuracy of the power is generally much higher, in a typical case 0.3-0.5 dB. By performing an output power measurement during at least one of these periods a calibration of the phase shift can be achieved, even though the main signal is of a non-constant envelope type. The power level in this period has a known relationship to the average power over the entire burst. If the phase error of the amplifier varies with output power, the maximum value for the envelope will be in phase, while the phase shift at dips in the envelope may differ. The phase shift monitoring is thus performed during a period of transmission of a constant amplitude signal within a non-constant envelope signal.

If any correction of the phase shift is needed, a correction of the phase shift added to the first signal is preferably performed when no useful signal is transmitted from the transceiver device, e.g. during a guard period between two time slots. Since the guard time is long enough to perform all setting procedures for the new phase shift, this will ensure that the signal transmitted during the following time slot does not have any defects caused by a phase-shifting in progress.

Figure 14:
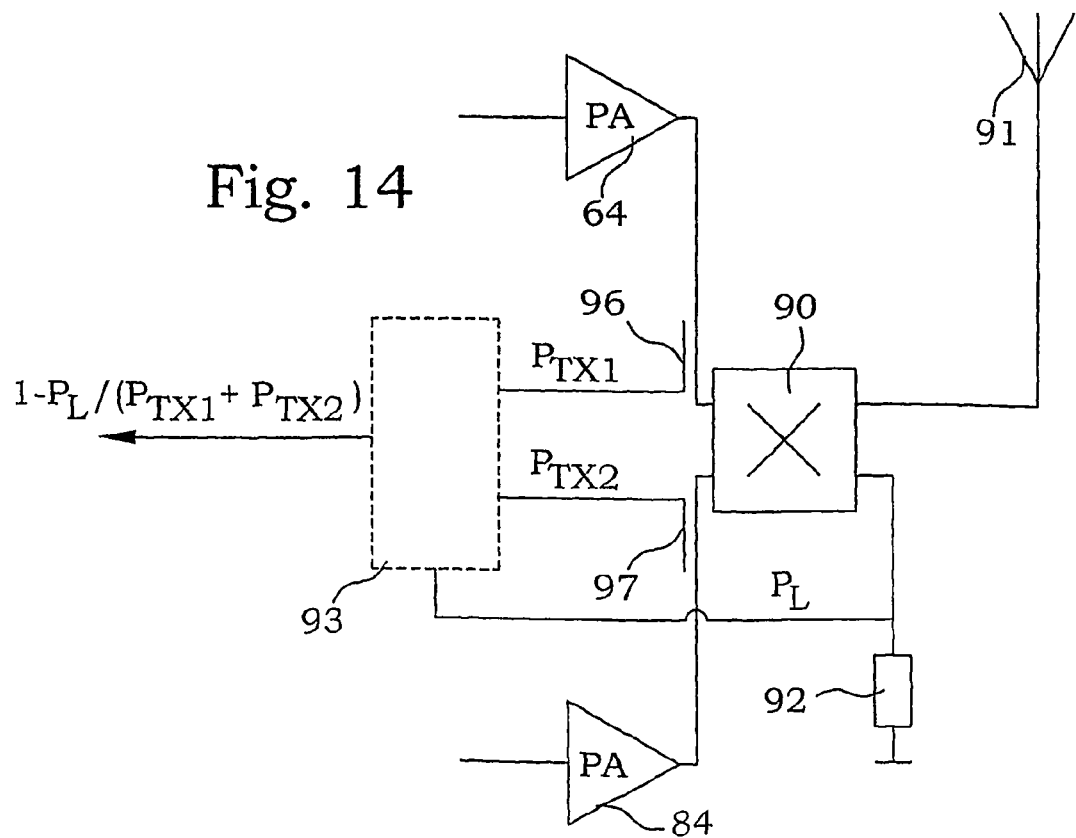
FIG. 14 is a block diagram of a part of yet another non-limiting example embodiment of a double transmitter unit according to the present invention.

In the above case, an a-priori knowledge about the expected amplitude of the transmitted signal is required. However, in more general transmission situations, such knowledge is not always available. In FIG. 14, another embodiment of a power meter 93 is illustrated. Only parts, which are directly involved, are illustrated. In this embodiment, the power meter 93 is still connected to measure the power over the load 92. However, the power meter 93 now also is supplied with signals from a first and a second power sensor 96, 97, measuring the output power from the power amplifiers 64 and 84, respectively. In this manner, the power meter can keep track on the power entering the hybrid combiner and the power exiting from it. A signal corresponding to $$1 - \frac{P_L}{(P_{TX1} + P_{TX2})}$$

where $P_L$ is the power dissipated over the load and $P_{TX1}$ and $P_{TX2}$ are the powers of the amplifier outputs. This quantity corresponds to the cosine factor between the signals from the power amplifiers. The phase shifter 63 (FIG. 6) can then according to this adjust any phase shift, if necessary. Such an arrangement may be very useful, e.g. if downlink power control is applied.

Figure 15:
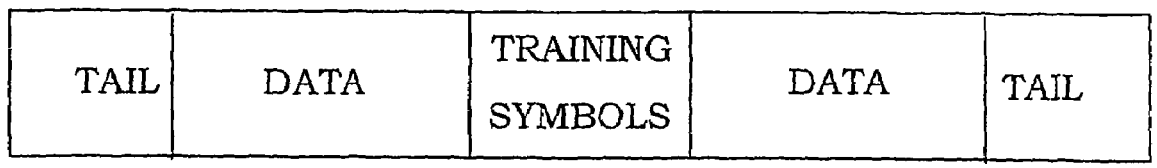
FIG. 15 illustrates a time slot used in GMSK or 8PSK modulation.

By measuring also the power of the components, it becomes possible to perform calibration of the phase shift also during periods in which non-constant envelope signals are transmitted. However, performing it during an arbitrary signal section induce a lot of problems. One solution is, however, to use signal sections of a-priori known digital content. When transmitting a time slot of data using e.g. GMSK modulation or 8PSK modulation, a section of "training symbols" is included in the data. This is schematically illustrated in FIG. 15. These training symbols are well-known and an expected output signal can easily be calculated. By monitoring power values according to FIG. 14, during the transmission of such training symbols, an actual output signal can be compared with the expected one, and a phase difference can be detected and used for calibration purposes.

Figure 16:
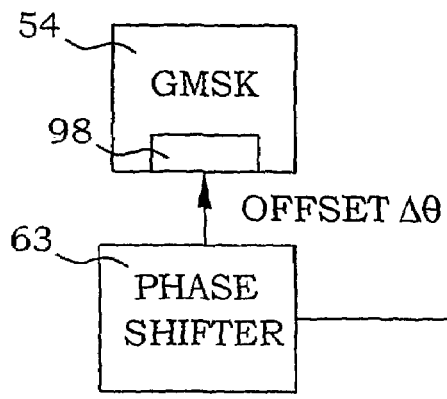
FIG. 16 is a block diagram illustrating an alternative phase shifter solution applicable or more non-limiting examples the present invention.
Figure 17:
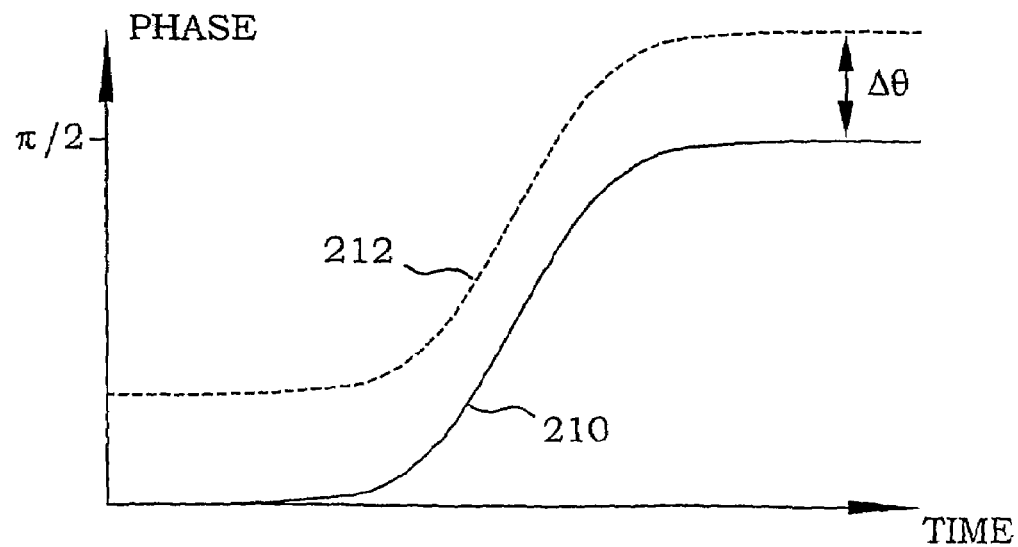
FIG. 17 is a diagram illustrating the principles of the phase shifter of FIG. 16.

Above, one embodiment of shifting the phase of a signal is illustrated. However, anyone skilled in the art understands that also other phase-shifting devices and methods can be employed. When operating in the TCC mode, one attractive alternative arises. FIG. 16 illustrates some selected parts of a transmitter arrangement having an alternative phase-shifting arrangement. The power meter 93 is as before connected to a phase shifter 63. However, in this embodiment, the phase shifter 63 is directly connected to the GMSK modulation means in the DSP 52. The phase shifter 63 evaluates the power signals from the power meter 93 and provides a requested phase shift AO to the GMSK modulation means 54. The GMSK modulation means 54 uses typically a tabulated state machine 98 operating according to a transfer function between the phase shift induced by the digital signal and time. A graph of such a function is illustrated in FIG. 17. The transfer function is draw with a full line and denoted by 210. By simply adding the phase shift Δθ provided by the phase shifter 63 to the value achieved from the transfer function, the entire signal will be provided with an additional phase shift. The phase-shift compensated transfer function will then look like the broken line 212.

In the above embodiments, the DSP's 52, 72 have comprised one constant-envelope modulation means and one non-constant envelope modulation means, in the form of a GMSK modulator and an 8PSK modulator. The DSP's may also comprise different types and different number of modulators. Other types of phase shift keying, such as 4PSK, are examples of possible other non-constant envelope modulators.

Another interesting non-constant envelope modulator that can be used in the present invention is a modulator for combined carrier signals. One embodiment of such a multi-carrier modulator is illustrated in FIG. 20. Here, two carriers of a GMSK modulation are combined, but it is also possible to combine carriers of other modulation schemes, e.g. 8PSK. Also, it is possible to combine carriers having different modulation schemes, e.g. one GMSK and one 8PSK carrier. Moreover, the basic ideas of this carrier combining can be generalized into more than two carriers. However, in such cases, bandwidth restrictions may set a practical limit.

The DSP 52 comprises a carrier combiner modulation means 220, in the present embodiment in turn comprising two GMSK modulators 54A, 54B. One of the outputs of the selector 55 is connected to the first GMSK modulator 54A. The first GMSK modulator means 54A is thus provided with the digital signal provided by the input 51, which represents the signal intended for the first carrier. An additional digital signal input 228 is provided to the second GMSK modulator 54B, whereby this modulator is provided with a digital signal, which represents the signal intended for the second carrier. An additional information input 222 is provided, which carries data defining a frequency difference between the two carriers, or in the present embodiment half this frequency difference. The digital signals are GMSK-modulated separately into digital I and Q representations. The I and Q representation from the first GMSK modulator 54A is then modulated in a pre-modulator 225 with a signal having half the difference frequency provided by input 222, but with an opposite phase direction, i.e. in practice minus half the difference frequency. The I and Q representation from the second GMSK modulator 54B is similarly modulated in a pre-modulator 226 with a signal having half the difference frequency provided by input 222. The digital I and Q signals are finally added in a summing means 224, providing a signal representing two digital signals on one carrier each, pre-modulated to frequencies of $\pm\Delta f/2$. The up-conversion of the frequency, taking place later in the chain, the frequency is selected to be the mean frequency of the two carriers.

The digital signals resulting directly from the GMSK modulators 54A, 54B are constant envelope signals. However, after the pre-modulation by the difference frequency, they exhibit a non-constant envelope behavior. The complex sum of these two signals is also of a non-constant envelope character. In analogy with the 8PSK case described above, it is possible to separate this sum signal into two components 31, 32 with constant envelopes (cf. FIG. 4). The process then continues in analogy with the 8PSK case described further above.

By using this scheme, any arbitrary combination of modulation schemes in any number of carriers can be combined and processed as a non-constant envelope signal. Since the choice of modulation schemes furthermore can be performed on a time slot basis, this opens up for a very high flexibility in the use of the transceiver unit arrangement according to the present invention. However, there are also some drawbacks present. First of all, since the frequency difference between the carriers is modulated into the signal even before the separation into components, the bandwidth of the signals that has to be treated throughout the transceiver unit path is increased. The increase in bandwidth corresponds approximately to the frequency difference. This puts very high demands on the components in the transceiver unit, in particular on the DAC's. There are, however, already today DAC components that would be able to handle at least neighboring frequencies. Using more than two carriers will of course make the bandwidth requirements even larger.

Another problem is that, if using more than two carriers, the output power per carrier will decrease. Since the total power is restricted by the sum of the power of each individual transceiver unit, this maximum power can not be exceeded. When having three or more carriers, the sum signal 15 has to be scaled down in order to assure that it can be separated into components, i.e. it has to be kept within double the component amplitude. In order to be absolutely sure that every possible combination will be covered, the output power of each carrier will be reduced by a factor n/2, where n is the number of carriers.

The principle of separating a non-constant envelope signal into constant envelope components opens up for a very flexible use of the transceiver units. However, this principle is not very power efficient when handling signals of low amplitude. Even if the total signal has a low amplitude, the components have high amplitudes, which means that a large portion of the power will be wasted when re-combining the components in the hybrid combiner. A large power will dissipate through the load.

Also, when the total signal has a low amplitude, small changes in the signal may cause very large phase changes of the components. The bandwidth necessary to process the components will therefore be larger when the total signal has a low amplitude.

A way to reduce the problems described above is to renounce the demand of keeping the component amplitude constant. By letting the component amplitude decrease when the total signal amplitude becomes small, some advantages are achieved. The required bandwidth will decrease and the total power efficiency will increase. However, such component amplitude variations should be kept within certain limits.

Another aspect to consider when deciding the reduction of the component amplitudes is the efficiency of the power amplifiers. Most power amplifiers exhibit the highest efficiency at the highest output values. A too large reduction in component amplitude will indeed result in higher efficiency in the combiner stage, but may reduce the efficiency in the power amplifier even more. The component amplitude reduction is thus preferably performed to optimize the allover efficiency.

As described in the above embodiments, there are a number of interesting advantages arising by using one or more non-limiting examples of the present invention. One of the main advantages is the high flexibility in using the arrangement. A user may easily, even on a time slot basis, change between different transmitting configurations. It is thus possible to change e.g. between high capacity and high output power, depending on the actual need. No re-calibrations have to be performed and the changes typically involve solely software changes.

It will be understood by those skilled in the art that various modifications and changes may be made to the present invention without departure from the scope thereof, which is defined by the appended claims.

REFERENCES

S. Mann, M. Beach, P. Warr and J. McGeehan, "Increasing the talk-time of mobile radios with efficient linear transmitter architectures", Electronics & Communication Engineering Journal, April 2001, Vol. 13, No. 2, pp. 65-76.

U.S. Pat. No. 5,990,734.

The invention claimed is:

1. A transmitter arrangement, comprising:
a first modulation unit having a first digital signal processor and a first analogue signal generator;
said first digital signal processor having a first digital signal input;
a first power amplifier, connected to an output of said first analogue signal generator;
a second modulation unit having a second digital signal processor and a second analogue signal generator;
said second digital signal processor having a second digital signal input;
a second power amplifier, connected to an output of said second analogue signal generator;
a combiner device connected to outputs of said first and said second power amplifiers;
a transmitter device connected to an output of said combiner device;
a first power monitor sensing a total power to said transmitter device or a quantity directly related thereto; and
a phase-shifter connected to said first power monitor, arranged for causing a phase shift of an analogue signal generated by said first analogue signal generator in response to said sensed total power,
wherein said first digital signal processor further comprises:
at least one first non-constant envelope modulation means;
a first signal component separator connected to an output of said at least one first non-constant envelope modulation means;
a first output of said first signal component separator being connectable to said first analogue signal generator;
first means for receiving modulation instructions;
at least one first constant envelope modulation means connectable to said first analogue signal generator; and
first modulation selecting means for connecting a modulation means to said first digital signal input in response to received modulation instructions, said first modulation selecting means being operable on a time slot basis, and
wherein said transmitter arrangement further comprises means for providing said first and said second digital signal inputs with a same digital signal, and said first and said second means for receiving instructions with the same instructions of a constant envelope modulation, allowing transmitter coherent combining.

2. The transmitter arrangement according to claim 1, wherein said second digital signal processor further comprises:
at least one second non-constant envelope modulation means of the same type as said at least one first non-constant envelope modulation means; and
a second signal component separator connected to an output of said at least one second non-constant envelope modulation means,
wherein an output of said second signal component separator being connectable to said second analogue signal generator, and
a sum of a signal of said first output of said first signal component separator and a signal of said output of said second signal component separator being equal to a signal of said output of said at least one first non-constant envelope modulation means.

3. The transmitter arrangement according to claim 1, wherein a second output of said first signal component separator being connectable to said second analogue signal generator.

4. The transmitter arrangement according to claim 1, wherein said second digital signal processor further comprises:
second means for receiving modulation instructions;
at least one second constant envelope modulation means connectable to said second analogue signal generator; and
second modulation selecting means for connecting a modulation means to said second digital signal input in response to received modulation instructions.

5. The transmitter arrangement according to claim 4, wherein said second modulation selecting means are operable on the time slot basis.

6. The transmitter arrangement according to claim 1, wherein said first power monitor is a power meter sensing a load of said combiner device.

7. The transmitter arrangement according to claim 1, wherein said phase-shifter comprises means for complex multiplication of said phase shift with a digital signal to be inputted to said analogue signal generator.

8. The transmitter arrangement according to claim 1, using GMSK modulation, wherein said phase-shifter comprises means for introducing a phase offset in said GMSK modulation, generated by using a table driven state machine in said first digital signal processor.

9. The transmitter arrangement according to claim 1, further comprising:
second power monitor sensing a power on said output of said first power amplifier and being connected to said phase-shifter; and
third power monitor sensing a power on said output of said second power amplifier and being connected to said phase-shifter;
said phase-shifter being arranged for causing a phase shift in response to a comparison between said sensed total power and said sensed powers on said outputs of said first and said second power amplifier, respectively.

10. The transmitter arrangement according to claim 1, wherein that said first and second non-constant envelope modulation means are selected from the list of:
4-PSK modulation means;
8-PSK modulation means; and
means for combination of at least two carriers.

11. The transmitter arrangement according to claim 4, wherein said first and said second constant envelope modulation means are GMSK modulation means.

12. A method for generating a transmitter signal in a transmitter arrangement having at least a first and a second modulation unit arranged in parallel, each one allowing for at least one non-constant envelope modulation and at least one constant envelope modulation, said first modulation unit having a first analogue signal generator, said second modulation unit having a second analogue signal generator, the method comprising the acts of:
providing digital signal to said first and said second modulation units;
providing modulation information to said first and second modulation units;
creating a first input signal to said first analogue signal generator by performing a constant envelope modulation of a first digital signal provided to said first modulation unit as a response of said modulation information being a request for said constant envelope modulation, and by performing a non-constant envelope modulation of said first digital signal and separating a first component of said non-constant envelope modulated first digital signal as a response of said modulation information being a request for said non-constant envelope modulation;
creating a second input signal to said second analogue signal generator by performing a constant envelope modulation of a second digital signal provided to said second modulation unit as said response of said modulation information being said request for said constant envelope modulation, and by performing said non-constant envelope modulation of said first digital signal and separating a second component of said non-constant envelope modulated first digital signal as said response of said modulation information being said request for said non-constant envelope modulation;
generating a first output signal in said first analogue signal generator according to said first input signal;
generating a second output signal in said second analogue signal generator according to said second input signal;
amplifying said first output signal;
amplifying said second output signal;
combining said first and said second amplified output signals to form an analogue transmitter signal,
wherein said providing acts are performed on a time slot basis, and
wherein said modulation information comprises said request for said non-constant envelope modulation, and said second digital signal is identical with said first digital signal, whereby said act of creating said second input signal to said second analogue signal generator is performed on said second signal in said second modulation unit.

13. The method according to claim 12, wherein said modulation information comprises said request for said non-constant envelope modulation, whereby said act of creating said second input signal to said second analogue signal generator is performed on said first signal in said first modulation unit, said method comprising the further act of transferring of said second input signal from said first modulation unit to said second analogue signal generator.

14. The method according to claim 13, wherein said non-constant envelope modulation is a 8-PSK modulation.

15. The method according to claim 13, characterized in that said non-constant envelope modulation is a multiple-carrier GMSK modulation, whereby said method comprises the acts of providing a set of at least two digital signals to both said first and said second modulating units, whereby said creating acts comprise the acts of performing a GMSK modulation of each digital signal and digital combining said modulated signals to form a non-constant envelope multi-carrier signal, whereby said separating act is performed on said non-constant envelope multi-carrier signal.

16. The method according to claim 12, wherein said modulation information comprises a request for transmitter coherent combining of constant envelope modulation signal, and said first digital signal is identical with said second digital signal.

17. The method according to claim 13, comprising the further acts of:
monitoring a power of said analogue transmitter signal or a quantity directly related thereto; and
shifting a phase of said first output signal according to said power.

18. The method according to claim 17, wherein said monitoring act comprises the act of measuring a power rejected during said combining act, whereby said power of said analogue transmitter signal is provided as a complementary quantity.

19. The method according to claim 17, wherein said shifting act in turn comprises the act of adjusting an initial offset phase of said first or said second modulating in a guard period between two time slots.

20. The method according to claim 17, wherein said shifting act in turn comprises the act of adding a phase shift in connection to the generation of the first output signal.

21. The method according to claim 13, wherein said monitoring and said phase shifting is performed when a constant envelope modulation with transmitter coherent combining is used, whereby said phase shifting is preserved when selecting said non-constant envelope modulation.

22. The method according to claim 13, wherein said monitoring and said phase shifting is performed during transmission of a constant amplitude period of said non-constant envelope signal.

23. The method according to claim 13, comprising the further act of measuring instantaneous power of said first and said second analogue output signals, whereby said shifting is performed according to a comparison of said power of said analogue transmitter signal and said power of said first and said second analogue output signals.

24. The method according to claim 23, wherein said shifting in the case of transmitter coherent combining is performed according to:

$$\varphi_{shift=cos}^{-1}(P_{TR}|(P_{TX1}P_{TX2})),$$

where $P_{TR}$ is said total power and $P_{TX1}$ and $P_{TX2}$ are said power of said first and second analogue output signals, respectively.

25. The method according to claim 23, wherein said comparison is performed during a period of a known training sequence in a time slot.

26. The method according to claim 12, comprising the further acts of:
reducing envelopes of said first and said second signals when said modulated signal has a low amplitude.

27. The method according to claim 26, wherein said act of reducing envelopes comprises minimizing of power consumption.

28. The method according to claim 12, comprising the further act of:
storing an adjusted phase shift value for each one of a set of used frequencies.

29. The method according to claim 28, comprising the further act of:
storing an adjusted phase shift value for each one of a set of used frequency generators for each of said used frequencies.

30. A transmitter unit, comprising:
a first modulation unit configured to receive a first digital signal and a first modulation selection signal and configured to output a first radio frequency signal corresponding to the first digital signal modulated according to the first modulation selection signal;
a second modulation unit configured to receive a second digital signal and a second modulation selection signal and configured to output a second radio frequency signal corresponding to the second digital signal modulated according to the second modulation selection signal;
a first power amplifier operatively connected to the first modulation unit and configured to amplify the first radio frequency signal;
a second power amplifier operatively connected to the second modulation unit and configured to amplify the second radio frequency signal;
a combiner operatively connected to the first and said second power amplifiers and configured to combine the first and said second radio frequency signals and output the combined radio frequency signals to a radio transmitter; and
a power meter configured to measure a power level of the combined radio frequency signals from the combiner,
wherein the first and said second modulation units are each operable to apply a modulation scheme according to the first and said second modulation selection signal, respectively, on a time slot basis, and
wherein the first modulation unit comprises:
a first modulation selector configured to select one of a constant-envelop modulation scheme and a non-constant-envelop modulation scheme based on the first modulation selection signal;
a first constant-envelop modulator configured to modulate the first digital signal according to the constant-envelop modulation scheme and output fist constant-envelop I and Q signals when the constant-envelop modulation scheme is selected;
a first non-constant-envelop modulator configured to modulate the first digital signal according to the non-constant-envelop modulation scheme and output a first non-constant-envelop I and Q signals when the non-constant-envelop modulation scheme is selected;
a first separator configured to separate the first non-constant-envelop I and Q signals from the first non-constant-envelop modulator and into first component I and Q signals and second component I and Q signals;
a phase shifter configured to receive the first constant-envelop I and Q signals from the first constant-envelop modulator and the first component I and Q signals from the first non-constant-envelop modulator and output phase shifted I and Q signals based on the power level of the combined radio frequency signals measured by the power meter; and
a first analogue signal generator configured to receive the phase shifted I and Q signals from the phase shifter and the first constant-envelop I and Q signals from the first constant-envelop modulator and output a first mixed signal at a first carrier frequency, wherein the first mixed signal is provided to the first power amplifier.

31. The transmitter unit of claim 30,
wherein the first and said second component I and Q signals from the first separator are first-first and first-second component I and Q signals, respectively,
wherein the second modulation unit comprises:
a second modulation selector configured to select one of the constant-envelop modulation scheme and the non-constant-envelop modulation scheme based on the second modulation selection signal;
a second constant-envelop modulator configured to modulate the second digital signal according to the constant-envelop modulation scheme and output second constant-envelop I and Q signals when the constant-envelop modulation scheme is selected;
a second non-constant-envelop modulator configured to modulate the second digital signal according to the non-constant-envelop modulation scheme and output a second non-constant-envelop I and Q signals when the non-constant-envelop modulation scheme is selected;
a second separator configured to separate the second non-constant-envelop I and Q signals from the second non-constant-envelop modulator and into second-first component I and Q signals and second-second component I and Q signals; and
a second analogue signal generator configured to receive the second-second component I and Q signals from the second separator and output a second mixed signal at a second carrier frequency, wherein the second mixed signal is provided to the second power amplifier.

32. The transmitter unit of claim 31, wherein the second modulation unit does not include a phase shifting device.

33. The transmitter unit of claim 30, wherein the second modulation unit comprises:
a second constant-envelop modulator configured to modulate the second digital signal according to the constant-envelop modulation scheme and output second constant-envelop I and Q signals when the constant-envelop modulation scheme is selected;
a second analogue signal generator configured to receive the second constant-envelop I and Q signals from the second constant-envelop modulator and the second component I and Q signals from the first separator of the first modulation unit and output a second mixed signal at a second carrier frequency, wherein the second mixed signal is provided to the second power amplifier.

34. The transmitter unit of claim 30,
wherein the first separator is configured such that a vector sum of the first and said second component I and Q signals is substantially equal to the first non-constant-envelop I and Q signals from the first non-constant-envelop modulator.

* * * * *

UNITED STATES PATENT AND TRADEMARK OFFICE
CERTIFICATE OF CORRECTION

PATENT NO.       : 7,469,017 B2
APPLICATION NO.  : 10/510338
DATED            : December 23, 2008
INVENTOR(S)      : Granstrom et al.

It is certified that error appears in the above-identified patent and that said Letters Patent is hereby corrected as shown below:

In Fig. 16, Sheet 11 of 12, for Tag "93", in the Box, insert -- POWER METER --.

In Fig. 18, Sheet 12 of 12, for Tag "63", in the Box, insert -- PHASE SHIFTER --.

In Fig. 18, Sheet 12 of 12, for Tag "87", in the Box, insert -- STORAGE --.

In Fig. 18, Sheet 12 of 12, for Tag "57", in the Box, insert -- QUADRATURE MODULATOR --.

In Column 3, Line 34, delete "or" and insert -- to one or --, therefor.

In Column 3, Line 63, delete "so" before "vector".

In Column 5, Line 17, delete "farther" and insert -- further --, therefor.

In Column 5, Line 45, delete "ease" and insert -- case --, therefor.

In Column 6, Line 26, delete "transmitted" and insert -- transmitter --, therefor.

In Column 7, Line 46, delete "A." and insert -- A --, therefor.

In Column 9, Line 61, delete "ICC" and insert -- TCC --, therefor.

In Column 16, Line 32, in Claim 16, delete "signal" and insert -- signals --, therefor.

In Column 17, Line 4, in Claim 24, delete " $\phi_{shift} = \cos^{-1}(P_{TR}|(P_{TX1}P_{TX2}))$, " and insert -- $\phi_{shift} = \cos^{-1}(P_{TR}|(P_{TX1} + P_{TX2}))$, --, therefor.

UNITED STATES PATENT AND TRADEMARK OFFICE
CERTIFICATE OF CORRECTION

PATENT NO. : 7,469,017 B2
APPLICATION NO. : 10/510338
DATED : December 23, 2008
INVENTOR(S) : Granstrom et al.

It is certified that error appears in the above-identified patent and that said Letters Patent is hereby corrected as shown below:

In Column 17, Line 63, in Claim 30, delete "fist" and insert -- first --, therefor.

Signed and Sealed this

Third Day of November, 2009

David J. Kappos
*Director of the United States Patent and Trademark Office*